(12) United States Patent
Dugger et al.

(10) Patent No.: US 6,309,289 B1
(45) Date of Patent: Oct. 30, 2001

(54) AIR FLOTATION AND LOCKING MATERIAL HANDLING APPARATUS AND METHOD OF USE

(76) Inventors: Ben A. Dugger, 122 Hickory La., Pell City, AL (US) 35128; Thomas Leon Jenkins, 200 Oak Forest Dr., Pelham, AL (US) 35124

( * ) Notice: Subject to any disclaimer, the term of this patent is extended or adjusted under 35 U.S.C. 154(b) by 0 days.

(21) Appl. No.: 09/586,674

(22) Filed: Jun. 1, 2000

(51) Int. Cl.[7] .................................................. B24B 47/00
(52) U.S. Cl. .............................. 451/388; 451/28; 180/125
(58) Field of Search ..................... 451/28, 388; 180/125, 180/164; 269/20, 21

(56) References Cited

U.S. PATENT DOCUMENTS 2,938,590 * 5/1960 Barnett ...................................... 180/1
3,253,665 * 5/1966 Schienle ................................... 180/7

* cited by examiner

Primary Examiner—Timothy V. Eley
Assistant Examiner—Dung Van Nguyen
(74) Attorney, Agent, or Firm—Robert J. Veal; Burr & Forman LLP

(57) ABSTRACT

A materials handling apparatus and method utilizing flotation pads to inject a thin fluid film to produce a near frictionless surface for easily positioning and finishing foundry castings. The present invention further relates to a material handling apparatus and method utilizing a vacuum lock to serve as a vice for securing foundry castings or other work pieces during finishing stages. The invention further incorporates an apparatus and method for protecting the vacuum lock components from damage or interference with material movement during positioning.

5 Claims, 2 Drawing Sheets

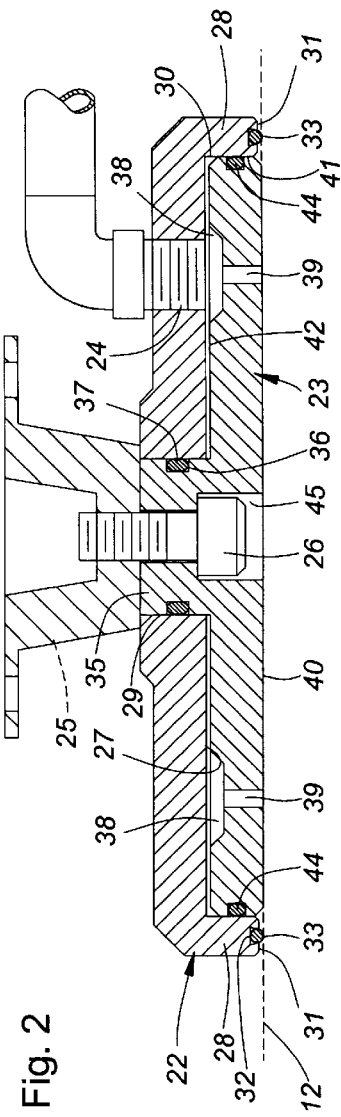
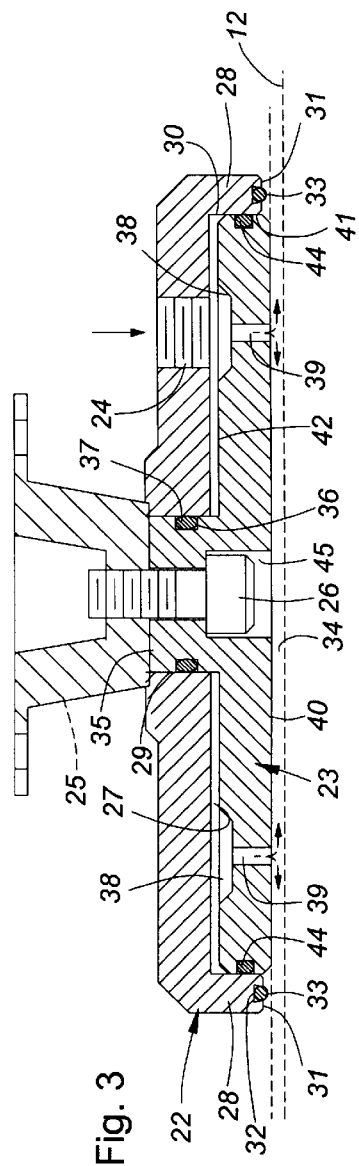
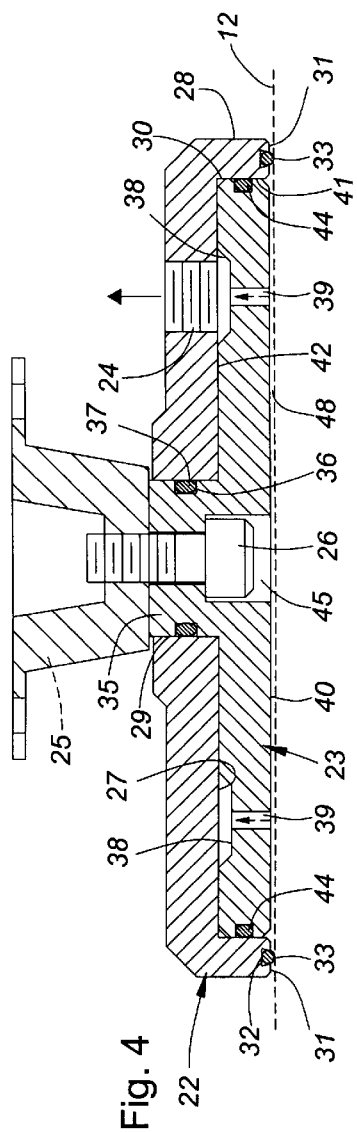
Fig. 2
Fig. 3
Fig. 4

AIR FLOTATION AND LOCKING MATERIAL HANDLING APPARATUS AND METHOD OF USE

FIELD OF THE INVENTION

The present invention relates to a material handling apparatus and method, in particular a material handling apparatus and method utilizing a thin fluid film to produce a near frictionless surface for easily positioning and finishing foundry castings. The present invention further relates to a material handling apparatus and method utilizing a vacuum lock device to serve as an anchor for securing foundry castings or other work pieces to a work surface during finishing stages. The present invention further relates to an apparatus and method of protecting the components of the vacuum lock device from damage or interference with positioning of the material.

BACKGROUND OF THE INVENTION

Parts made by various casting techniques have some form of excess material, which must be removed from the object during finishing. In many instances it is often desirable to perform additional machining on cast pieces during the finishing process. In the finishing of metal parts in particular, the work objects are often very heavy, making it difficult to position these items without mechanical assistance. Even with mechanical assistance, it is often difficult to accurately position a work piece in proper relation to grinders, cutting wheels, drill presses, or other machining tools. Once positioned, work pieces must be secured in place during machining. Worker fatigue and injury can result from the worker attempting to position heavy work pieces during materials finishing processes. Workers may also be injured when they attempt to secure work pieces in place during machining. Improving the ease and speed of work piece alignment, providing greater tooling accuracy, improving worker safety, and improving equipment reliability are still possible and desired.

SUMMARY OF THE INVENTION

It is the object of the present invention to provide a material handling apparatus and method that combines ease of movement, alignment, and securement of heavy work pieces during materials finishing processes. Each of these characteristics enhances worker safety by reducing exposure to hazards associated with handling materials during finishing processes.

Ease of movement is achieved by the injection of a pressurized fluid through the flotation pad of the present invention. Injection of the pressurized fluid produces a thin fluid film surface between the flotation pads of the present invention and a table surface at a finishing process station. The thin fluid film provides a nearly frictionless bearing surface, which permits the easy movement of even the heaviest work pieces.

Ease of alignment is achieved by the flotation pad's ability to translate the work piece throughout the horizontal plane defined by the finishing process table. In addition, the flotation pad permits rotation of the work piece about a vertical axis relative to the float pad.

Once a work piece is positioned, a vacuum source may be applied to the flotation pad. The vacuum source removes the thin fluid film surface from between the flotation pad and the finishing process table surface, thereby removing the frictionless surface. Additionally, to achieve a substantially stronger bond, a seal on the lower surface of the flotation pad mates with the finishing station table surface forming a vacuum lock between the flotation pad and the finishing station table surface.

While the seal on the lower surface of the flotation pad permits the vacuum lock features described in the proceeding paragraph, the seal is subject to damage or may interfere with the nearly frictionless movement of the work piece if the seal is not adequately raised from the table surface when the flotation pad is pressurized. These problems are avoided by the sliding engagement of a flotation pad disk within the flotation pad skirt during pressurization and vacuum cycles. During pressurization, the flotation pad disk extends beyond the lower face of the seal, which in combination with the thin film surface, provides the clearance necessary to avoid seal contact with the table surface. When a vacuum is applied to the flotation pad, the flotation pad disk is drawn into the flotation pad skirt, permitting formation of the vacuum lock.

Thus, in addition to positioning a work piece in an infinite number of orientations, the present invention also provides for rapidly securing the work piece in any of the previously mentioned orientations, while protecting the seal from damage or interference with work piece positioning.

BRIEF DESCRIPTION OF THE DRAWINGS

Apparatus embodying features of my invention are depicted in the accompanying drawings which form a portion of this disclosure wherein:

FIG. 2 is a side cross sectional view of a float pad in a neutral position;

FIG. 3 is a side cross sectional view of a float pad in response to a pressurized fluid source applied to the fluid port; and FIG. 4 is a side cross sectional view of a float pad in response to a vacuum attached to the fluid port.

DESCRIPTION OF THE PREFERRED EMBODIMENT

Figure 1:
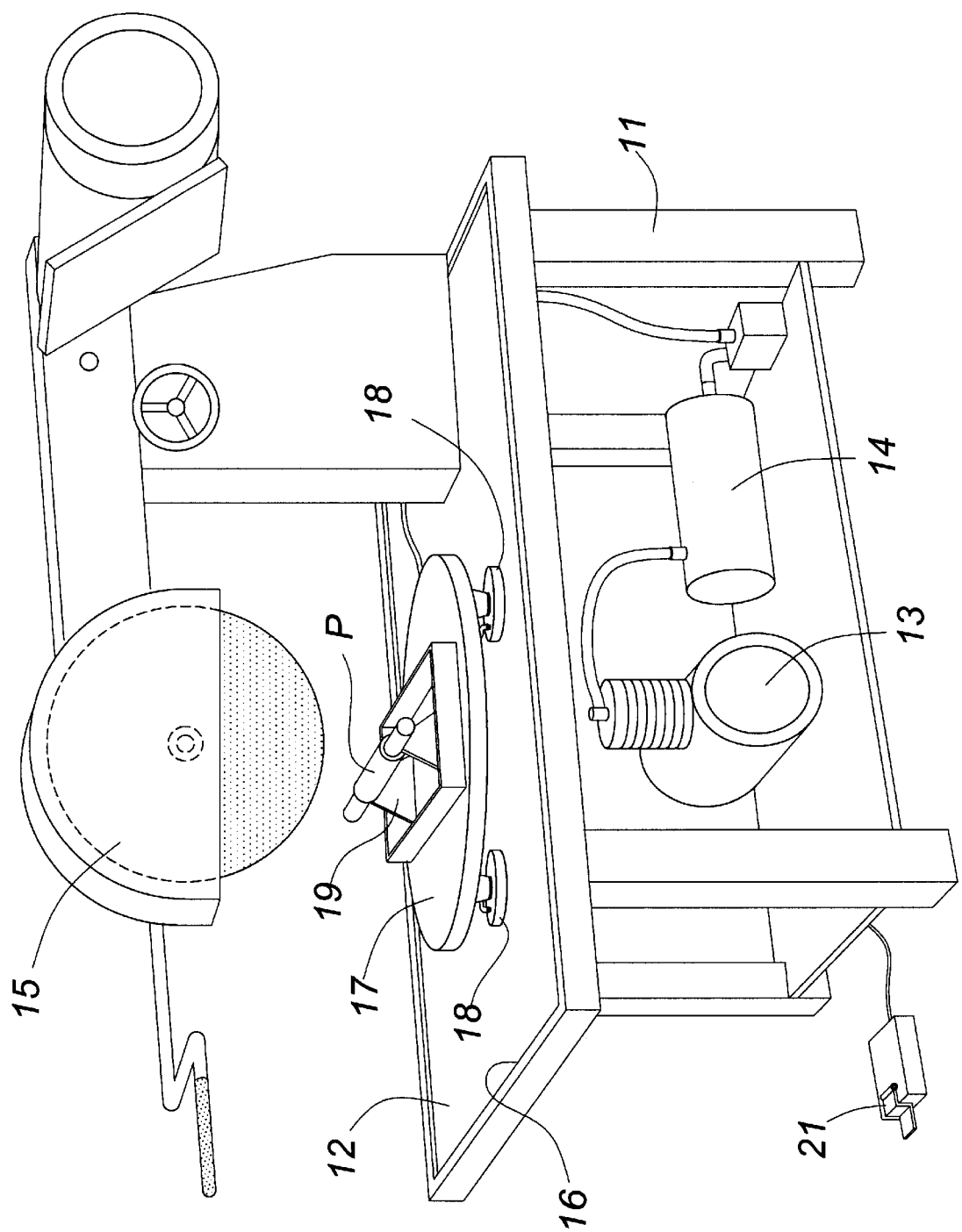
FIG. 1 is a side elevation view of a table mounted cut-off machine with an air float positioning table.

Referring to the drawings for a clearer understanding of the invention, it may be seen in FIG. 1 that the apparatus includes a frame 11, which supports a substantially horizontal flat surface 12, a compressed air source 13, a vacuum source 14, and in this embodiment a cut-off saw 15.

Substantially horizontal flat surface 12 is surrounded by a raised lip 16, which prevents the gondola 17 from sliding off the flat surface 12. In this embodiment, the gondola 17 has three flotation pads 18 attached to the lower surface of the gondola 17 in substantially isosceles triangular arrangement. The gondola also has a jig 19 for holding the work piece P in place on the gondola 17.

When the compressed air source 13 is applied to the flotation pads 18 via a flexible conduit 20, as is well known in the art, a thin fluid film layer 34 is formed between the float pad 18 and the flat surface 12. The thin fluid film layer 34 provides a virtually frictionless bearing between the flotation pads 18 and the flat surface 12. The gondola 17 holding the work piece P may then be easily positioned under the cut-off saw 15. Once in position the compressed air source 13 is removed from the float pads 18.

The gondola 17 holding the work piece P may then be further adjusted in position against normal frictional forces between flotation pads 18 and flat surface 12. When the work piece P is in final position for cutting, a vacuum source 14 is applied to the flotation pads 18 locking the float pads 18 and hence the gondola 17 and work piece P in place for cutting with cut-off saw 15 to trim excess material or otherwise finish the work piece P.

A foot switch 21 may be used to control the vacuum 14 and compressed air 13 source applied to the flotation pads 18.

In the presently described embodiment, it is the operation of float pads 18 which perform the foregoing described features of the overall apparatus. The remaining figures diagram the operation of the float pads 18 in response to vacuum 14 and compressed air 13 sources.

As may be seen from FIG. 2, each flotation pad 18 comprises of a float pad seal skirt 22, a floatation pad seal skirt O-ring 33, a float pad disk 23, a fluid port 24, a swivel mount 25, and a bolt 26 for securing the float pad disk 23 to swivel mount 25. By this arrangement float pad seal skirt 22 is permitted to reciprocate upwardly or downwardly in response to pressurization and depressurization of fluid port 24.

The float pad seal skirt 22 comprises a lower recessed area 27 defined by a circular downwardly extending annular flange 28, a central bore 29, and a fluid port 24. The downwardly extending annular flange 28 further comprises an inner face 30 and a bottom face 31. A double tapered annular groove 32 on the seal skirt bottom face 31 receives an o-ring 33 in captive engagement therein. Central bore 29 is of substantially smaller diameter than the lower recessed area 27.

The float pad disk 23 comprises an upper disk surface 42 having an integral cylindrical shaft 35 extending upwardly from the center of the float pad disk 23. The cylindrical shaft 35 having a diameter such that it is slidably received within the central bore 29 of the seal skirt 22. Cylindrical shaft 35 further comprises an outer annular groove 36, which receives an o-ring 37 therein, and an inner bore 45 of varied diameters to accept securing bolt 26. O-ring 37 provides sliding sealing engagement with the seal skirt central bore 29.

The float pad disk upper surface 42 further comprises an annular groove 38. Fluid jets 39 are evenly spaced around annular groove 38 such that they are in fluid communication with the annular groove 38 and extend through the float pad disk 23 to the float pad disk lower surface 40. Fluid jets 39 are dimensioned such that they have a combined cross sectional surface area substantially smaller than the cross sectional surface area of fluid port 24.

The outer circumferential surface 41 of float pad disk 23 is dimensioned such that it is slidingly accepted within the lower recessed area 27 of the float pad seal skirt 22. The upper and lower edges of the outer circumferential surface 41 are chambered to facilitate the sliding engagement of the float pad disk 23 in the lower recessed area 27 of the float pad seal skirt 22. An annular groove 43 in the outer circumferential surface 41 accepts an o-ring 44 for sliding sealing engagement with annular flange inner face 30.

The thickness of the float pad disk 23 is dimensioned such that when it is completely engaged in lower recessed area 27, float pad seal skirt o-ring 33 extends beyond the lower surface 40 of the float pad disk 23.

FIG. 2 depicts, a flotation pad 18 in a neutral position, i.e. without a vacuum 14 or compressed air source 13 applied.

FIG. 3 depicts a flotation pad 18 with a pressurized air source 13 connected to fluid port 24. The pressurized air 13 enters fluid port 24, which is in fluid communication with annular groove 38 on the upper surface 42 of the float pad disk 23. Float pad disk o-rings 37 and 44 contain the compressed air 13 within lower recessed area 27. The compressed air 13 pressurizes the recessed area 27 forcing seal skirt 22 upward. Swivel mount 25 limits the travel of seal skirt 22 such that float pad seal skirt o-ring 33 is raised from the substantially horizontal flat surface 12 protecting o-ring 33 from damage and preventing o-ring 33 from interfering with float pad 18 movement across flat surface 12.

Simultaneously with seal skirt 22 lifting, compressed air 13 passes through fluid jets 39 introducing a thin fluid film layer 34 between flotation pads 18 and flat surface 12. The presence of thin fluid film layer 34 provides a near frictionless bearing surface. Work piece P is mounted in gondola 17, and is supported by the fluid film layer 34, allowing ready translation of the work piece P across flat surface 12.

When compressed air source 13 is removed from fluid port 24 the flotation pad returns to the neutral condition depicted in FIG. 2. Upon removal of compressed air source 13 thin fluid film layer 34 to quickly dissipates. The absence of the thin fluid film surface 34 returns normal frictional interference between float pad disk lower surface 40, seal skirt o-ring 33, and flat horizontal surface 12. Upon depressurization float pad seal skirt 22 moves downwardly urging seal skirt o-ring 33 against flat surface 12, conforming to the surface thereof, permitting the formation of a locking vacuum seal upon application of vacuum source 14 at fluid port 24.

FIG. 4 depicts the operation of flotation pad 18 in response to vacuum 14. Application of vacuum 14 to fluid port 24 evacuates any residual fluid film surface 34 between flat surface 12 and flotation pad 18. As further vacuum 14 is applied, float pad disk 23 is drawn into recessed area 27 engaging float pad seal skirt o-ring 33 with flat surface 12, forming vacuum chamber 48 within the area defined by float pad seal skirt o-ring 33, flat surface 12, and vacuum source 14. The vacuum forces lock the float pads 18 and thereby gondola 17 in position while cut-off saw 15 removes excess materials or otherwise finishes work piece P.

It is to be understood that the form of the invention as shown herein is a preferred embodiment thereof and that various changes and modifications may be made therein without departing from the spirit of the invention or scope as defined in the following claims.

What is claimed is:

1. A materials handling apparatus for positioning objects on a substantially horizontal flat surface comprising, in combination with said horizontal flat surface; at least one flotation pad comprising a seal skirt and a floatation pad disk, said floatation pad having a substantially planar lower surface and supporting at least a portion of the weight of said object;

said seal skirt comprising, a recessed area defined by a downwardly extending annular flange, a fluid port, a bottom surface on said downwardly extending annular flange, sealing means attached to said bottom surface selectively sealingly engaged with said flat horizontal surface;

said floatation pad disk sealingly engaged in said seal skirt recessed area, said floatation pad disk comprising a body portion having a thickness commensurate with said annular flange such that the floatation pad disk lower surface may be selectively spaced relative to said horizontal surface, a plurality of fluid jets extending through said body portion and selectively communicating a pressurized fluid source and a vacuum source between said fluid port and said floatation pad disk lower surface;

said pressurized fluid forming a thin fluid film layer between said floatation pad lower surface and said horizontal flat surface; and said vacuum removing said thin fluid film layer and engaging said sealing means with said flat horizontal surface defining a vacuum chamber therein and lockingly engaging said floatation pad to said flat horizontal surface.

2. A materials handling apparatus for positioning objects on a substantially horizontal flat surface comprising, in combination with said horizontal flat surface; at least one flotation pad, comprising a seal skirt, a floatation pad disk, and means to secure said floatation pad disk to said seal skirt, said pad having a substantially planar lower surface and supporting at least a portion of the weight of said object:

said seal skirt comprising, a recessed area defined by a downwardly extending annular flange, and a fluid port; and said floatation pad disk sealingly engaged in said recessed area of said seal skirt, said floatation pad disk comprising, a body portion having a thickness commensurate with said annular flange such that the floatation pad disk lower surface may be selectively spaced relative to said horizontal surface; a plurality of fluid jets extending through said body portion communicating a pressurized fluid between said fluid port and said lower surface of said floatation pad disk, said pressurized fluid forming a thin fluid film layer between said pad lower surface and said horizontal flat surface.

3. A materials handling apparatus for positioning objects on a substantially horizontal flat surface comprising, in combination with said horizontal flat surface; at least one flotation pad comprising a seal skirt, a floatation pad disk, means to secure said floatation pad disk to said seal skirt, and a mount for supporting at least a portion of the weight of said object, said pad having a substantially planar lower surface:

said seal skirt comprising, a lower recessed area defined by a circular downwardly extending annular flange, said annular flange having inner face and a bottom face, a central bore of substantially smaller diameter than the lower recessed area, and a fluid port;

said floatation pad disk comprising, a disk body having an upper disk surface, a lower surface, and an outer circumferential surface;

said upper disk surface having an integral cylindrical shaft extending upwardly therefrom, said cylindrical shaft having substantially the same outer diameter as said seal skirt central bore, an annular groove in said shaft, and an o-ring pressed into said groove, said o-ring sealingly engaged with said seal skirt central bore;

said upper disk surface having an annular groove in fluid communication with said seal skirt fluid port and having a plurality of fluid jets evenly spaced around said groove communicating a pressurized fluid between said fluid port and said lower surface of said floatation pad, said pressurized fluid forming a thin fluid film layer between said pad lower surface and said horizontal flat surface, said lower disk surface lying within substantially the same plane as said lower face of said seal skirt; and said outer circumferential surface having an annular groove therein, an o-ring pressed into said groove, said o-ring in sealing engagement with said seal skirt flange inner wall.

4. The materials handling apparatus of claim 3 wherein said lower face of said seal skirt flange has formed therein an annular groove with an o-ring pressed into said groove, and further comprising vacuum means applied to said seal skirt fluid port, said vacuum means removing said fluid film surface to bring said o-ring in sealing engagement with said substantially horizontal flat surface lockingly engaging said floatation pad to said substantially horizontal flat surface.

5. The flotation pad of claim 4, wherein said floatation pad disk is in reciprocally sliding engagement with said seal skirt flange inner wall and said skirt flange central bore.

* * * * *